United States Patent
Yoshida

(10) Patent No.: US 8,570,631 B2
(45) Date of Patent: Oct. 29, 2013

(54) OPTICAL SCANNING DEVICE AND IMAGE FORMING APPARATUS

(75) Inventor: Shingo Yoshida, Osaka (JP)

(73) Assignee: Kyocera Mita Corporation (JP)

( * ) Notice: Subject to any disclaimer, the term of this patent is extended or adjusted under 35 U.S.C. 154(b) by 90 days.

(21) Appl. No.: 13/292,155

(22) Filed: Nov. 9, 2011

(65) Prior Publication Data

US 2012/0134001 A1    May 31, 2012

(30) Foreign Application Priority Data

Nov. 30, 2010 (JP) .................. 2010-267256

(51) Int. Cl.
*G02B 26/08* (2006.01)

(52) U.S. Cl.
USPC ...................................... 359/205.1

(58) Field of Classification Search
USPC ............................... 359/205.1–207.8
See application file for complete search history.

(56) References Cited

U.S. PATENT DOCUMENTS

| | | | |
|---|---|---|---|
| 8,081,363 B2 * | 12/2011 | Kuribayashi | 359/207.9 |
| 2003/0214694 A1 | 11/2003 | Sakai | |

FOREIGN PATENT DOCUMENTS

| | | |
|---|---|---|
| JP | 60-122839 | 8/1985 |
| JP | 03-171113 | 7/1991 |
| JP | 04181914 | 6/1992 |
| JP | 2822255 | 9/1998 |
| JP | 2002023082 | 1/2002 |
| JP | 2002040340 | 2/2002 |
| JP | 2002055291 | 2/2002 |
| JP | 2004-004154 | 1/2004 |
| JP | 2004-354680 | 12/2004 |
| JP | 2008-286851 | 11/2008 |
| JP | 2010217753 | 9/2010 |

* cited by examiner

*Primary Examiner* — Euncha Cherry
(74) *Attorney, Agent, or Firm* — Gerald E. Hespos; Michael J. Porco; Matthew T. Hespos

(57) ABSTRACT

An optical scanning device includes a light source for emitting a laser beam; a deflection body for deflecting the laser beam; a scanning lens for scanning the deflected laser beam on the surface of a photosensitive body; a reflection body having a reflection surface for reflecting the deflected laser beam towards the photosensitive body and having passed through the scanning lens; and a synchronizing sensor for receiving the reflected laser beam to send out a detection signal. The reflection surface has a curved arc surface depressed from both edges toward a center in a main-scanning direction equivalent to a scanning direction of the laser beam. The reflection body has a center of the reflection surface in the main-scanning direction displaced by a predetermined range in the direction of travel of the laser beam along the main-scanning direction from a center of the reflection body in the main-scanning direction.

8 Claims, 5 Drawing Sheets

OPTICAL SCANNING DEVICE AND IMAGE FORMING APPARATUS

BACKGROUND OF THE INVENTION

1. Field of the Invention

The present invention relates to an optical scanning device which scans the surface of photosensitive body by deflecting laser light towards a predetermined direction at a constant speed, and to an image forming apparatus utilizing the same.

2. Description of the Related Art

A conventional technique has been known relating to an optical scanning device for laser printers and copiers in which a laser beam emitted from a light source is deflected by rotation of a polygon mirror for scanning, a portion of the laser beam having passed through an imaging lens is reflected by a fold mirror, a BD (Beam Detect) sensor sends out a detection signal when it receives the portion of the laser beam at its light receiving surface, and timing of the initiation of writing to a photosensitive body is provided based on the detection signal.

According to the conventional art, for example, the fold mirror is composed of a concave mirror in order to guide a light beam (laser beam) having passed through a scan lens (imaging lens) to a BD sensor. The concave mirror is attached to an L-shaped mounting bracket, and an adjusting screw comes into contact with the back side of the concave mirror, allowing adjustment of slope of the concave mirror by changing the protruding amount of the screw.

However, the above conventional art has problems of not only an increased cost due to necessity of an extra member for attaching a concave mirror such as the L-shaped mounting bracket, but also of difficulties in assembly such that the detection accuracy of a BD sensor may be affected due to damages on the surface of the concave mirror caused by contact between the member and the mirror upon mounting.

When the concave mirror is attached so as to make an angle as big as possible between a laser beam received by a light receiving surface of a BD sensor previously reflected by the concave mirror and a laser beam thereafter initiating scanning the surface of a photosensitive body previously deflected by a polygon mirror, it is necessary to increase the duration for deflecting a laser beam for scanning on one surface of the polygon mirror, causing a problem such that the optical scanning device may be enlarged.

SUMMARY OF THE INVENTION

With the foregoing in view, it is an object of the present invention to provide an optical scanning device and an image forming apparatus which facilitate assembly thereof and allow downsizing thereof.

In order to fulfill the above object, the present invention relates to an optical scanning device which comprises:
- a light source for emitting a laser beam;
- a deflection body for deflecting by reflection of the laser beam emitted from the light source;
- a scanning lens for scanning the laser beam deflected by the deflection body on a surface of a photosensitive body at a constant speed;
- a reflection body having a reflection surface for reflecting the laser beam deflected towards the outside of the photosensitive body and having passed through the scanning lens; and
- a synchronizing sensor for receiving the laser beam reflected by the reflection surface to send out a detection signal of the receipt of the laser beam, wherein the reflection surface is composed of a curved arc surface depressed from both edges towards a center in a main-scanning direction equivalent to a scanning direction of the laser beam, and the reflection body is configured such that a center of the reflection surface in the main-scanning direction is provided at a position displaced by a predetermined range in a direction of travel of the laser beam along the main-scanning direction from a center of the reflection body in the main-scanning direction.

According to the present invention, a center of a reflection surface in the main-scanning direction is provided at a position displaced by a predetermined range in a direction of travel of a laser beam along the main-scanning direction from a center of a reflection body in the main-scanning direction.

These and other objects, features and advantages of the present invention will become apparent upon reading of the following detailed description along with the accompanied drawings.

DETAILED DESCRIPTION OF THE PREFERRED EMBODIMENTS

Figure 1:
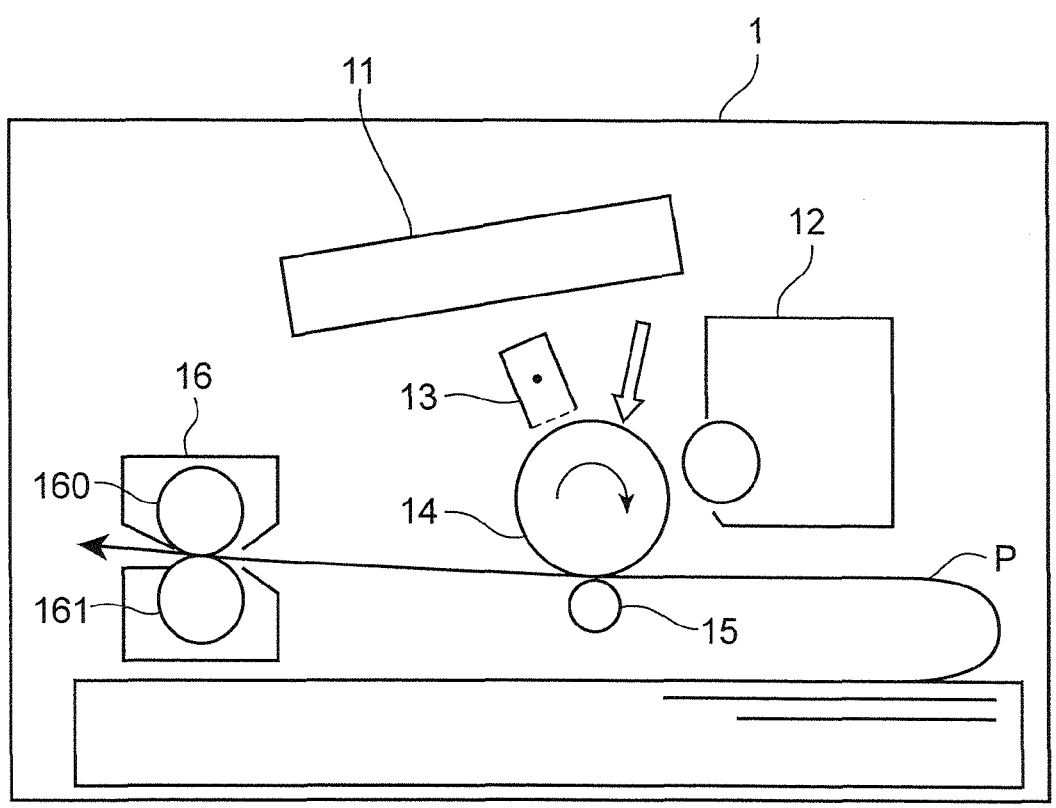
FIG. 1 is a section view showing one embodiment of a mechanical structure of a printer serving as the image forming apparatus according to one aspect of the present invention.

One aspect of the image forming apparatus according to the present invention is now described along with the figures. As shown in FIG. 1, a printer 1 is configured to comprise a laser scanner 11, a developing unit 12, a charging unit 13, a photosensitive drum 14, a transfer roller 15 and a fusing unit 16.

The photosensitive drum 14 serving as the photosensitive body according to the present invention is a cylindrical member and rotates in a clockwise direction as illustrated in FIG. 1 driven by a motor (not shown). The charging unit 13 charges the surface of the photosensitive drum 14 in a generally uniform manner.

The laser scanner 11 serving as the optical scanning device according to the present invention comprises a light source such as a laser diode, and emits a light signal based on image data on the surface of the photosensitive drum 14 which has been charged by the charging unit 13 in a generally uniform manner to form an electrostatic latent image of the image data.

The image data is received at the printer 1 from a PC (personal computer) and the like connected to the printer 1. The details of the laser scanner 11 are described below along with FIG. 2.

The developing unit 12 comprises a toner container containing toner and feeds toner on the surface of the photosensitive drum 14 onto which the electrostatic latent image has been formed to form a toner image. The toner image formed on the photosensitive drum 14 is transferred to paper as it is transported through a transport guide P or to a transfer belt (not shown) via the transfer roller 15 which is described below.

The transfer roller 15 is arranged at the position facing the photosensitive drum 14. The transfer roller 15 is composed of a conductive rubber material and the like and transfers the toner image formed on the photosensitive drum 14 to paper as it is transported through the transport guide P or to the transfer belt.

The fusing unit 16 comprises a fusing roller 160 having an internal heater and the like and a pressure roller 161 provided at a position facing the fusing roller 160, and transports while heating paper onto which the toner image has been formed to fix the toner image to the paper.

Briefly, the formation of an image in the printer 1 is now illustrated. First, the surface of the photosensitive drum 14 is charged in a generally uniform manner by the charging unit 13. The laser scanner 11 then irradiates the surface of the photosensitive drum 14 charged to form an electrostatic latent image to be formed on paper on the surface of the photosensitive drum 14. The developing unit 12 develops the electrostatic latent image by applying toner on the surface of the photosensitive drum 14, the toner image on the surface of the photosensitive drum 14 is then transferred to the paper by the transfer roller 15. After these operations, the toner image transferred on the paper is fixed by the fusing unit 16.

Figure 2:
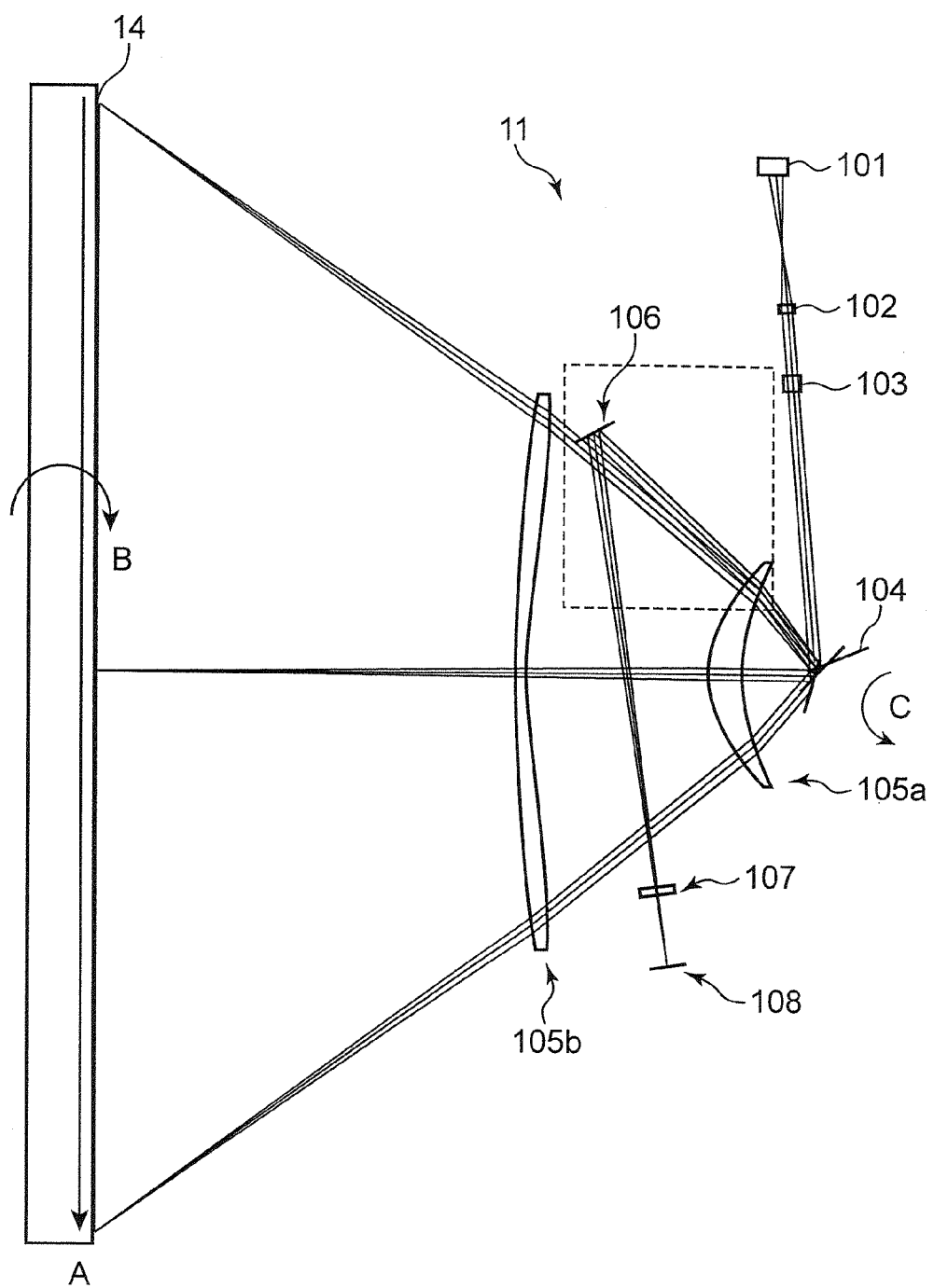
FIG. 2 is a structural view showing one embodiment of a mechanical structure of a laser scanner.

As shown in FIG. 2, a laser scanner 11 is configured to comprise a semiconductor laser 101 serving as the light source according to the present invention, a collimator lens 102, a diaphragm 103, a rotating polygon mirror 104 serving as the deflection body according to the present invention, scanning lenses 105a and 105b (hereinafter, the scanning lenses 105a and 105b are referred to collectively as a scanning lens group 105), a mirror 106 serving as the reflection body according to the present invention, a cylindrical lens 107 serving as the condensing lens according to the present invention and a BD (Beam Detect) sensor 108 serving as the synchronizing sensor according to the present invention.

The semiconductor laser 101 emits a laser beam having a predetermined wavelength. The collimator lens 102 and the diaphragm 103 jointly generally collimate the laser beam generated by the semiconductor laser 101. The rotating polygon mirror 104 has a plurality of mirrors on its peripheral surface for reflecting the laser beam received via the collimator lens 102 and the diaphragm 103, and is configured to rotate at a constant speed in the direction of arrow C shown in the figure by driving force from a polygon motor described below. The laser beam received at the respective rotating mirrors is deflected into beams whose angle is continuously altered, and the deflected beams are reflected towards the photosensitive drum 14.

The scanning lens group 105 condenses the deflected laser beams from the rotating polygon mirror 104 and, the scanning lenses 105a and 105b jointly scan the condensed beam in a horizontal fashion at a constant speed in the main-scanning direction relative to the photosensitive drum 14 (in the direction shown by A in the figure).

The mirror 106 includes a reflection surface having a curved arc surface depressed from both edges to the center along the main-scanning direction, i.e. an anamorphic aspheric reflection surface, and reflects, towards the BD sensor 108, the laser beam deflected towards the outside of the photosensitive drum 14 among the laser beams having passed through the scanning lens 105a. The details of the mirror 106 are described hereinafter.

The cylindrical lens 107 condenses the laser beams reflected by the mirror 106. The BD sensor 108 receives the condensed laser beam from the cylindrical lens 107.

The BD sensor 108 is used to synchronize timing of the initiation of the horizontal scanning on the photosensitive drum 14 by laser beams, i.e. timing of the emission of laser beam from the semiconductor laser 101, with the rotation of the rotating polygon mirror 104.

More specifically, the BD sensor 108 receives laser beams reflected by the rotating polygon mirror 104 via the mirror 106 and the cylindrical lens 107 and sends out a detection signal of the receipt of the beams. The detection signal from the BD sensor 108 is used to synchronize the rotation of the rotating polygon mirror 104 with timing of writing of image data, i.e. writing in the direction of arrow shown by A.

Figure 3:
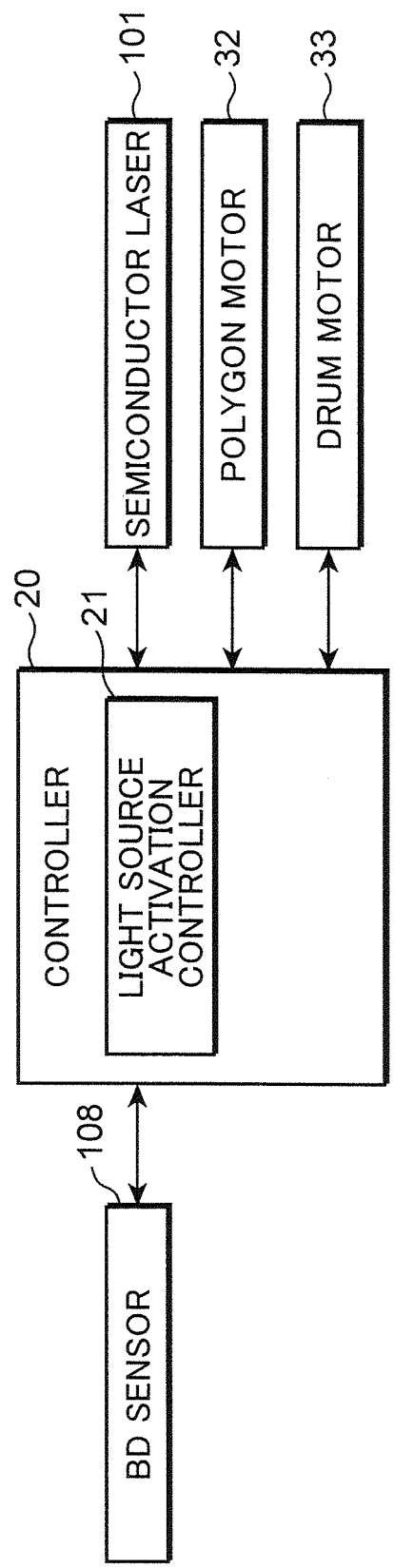
FIG. 3 is a block diagram showing an electrical structure of a printer.

As shown in FIG. 3, the printer 1 further comprises a controller 20 for controlling the whole printer 1.

The controller 20 comprises a CPU and memory such as ROM for storing an operation program for the whole apparatus such as a control program of the operations in image formation; RAM for temporarily storing image data and the like as well as providing the work area; nonvolatile memory for storing settings of various control parameters and a hard disk (HDD). The whole apparatus is controlled when the CPU runs an operation program stored in ROM.

The controller 20 is connected to a polygon motor 32 which drives the BD sensor 108, the semiconductor laser 101 and the rotating polygon mirror 104 and to a drum motor 33 which drives the photosensitive drum 14, and comprises an interface circuit (not shown) which inputs and outputs a detection signal from the BD sensor 108 or a signal controlling activation of the semiconductor laser 101, the polygon motor 32 and the drum motor 33.

The controller 20 also acts as a light source activation controller 21. The light source activation controller 21 rotates the rotating polygon mirror 104 at a predetermined rotation speed while emits to the semiconductor laser 101 a laser beam according to image data of a latent image to be formed on the photosensitive drum 14 at a predetermined timing when the emission is synchronized with the rotation. It also controls the amount of light from a laser diode by using a detection signal from a photodiode provided in the semiconductor laser 101 (Automatic Power Control, hereinafter referred to as APC).

Accordingly, under the control by the light source activation controller 21, the photosensitive drum 14 is scanned (exposed) in a horizontal fashion for the amount of one line in the main-scanning direction (the direction shown by A in FIG. 2) of image data. Then, under the control by the controller 20, the photosensitive drum 14 rotates for the amount of one line in the sub-scanning direction (the direction shown by B in FIG. 2) followed by an exposure of the amount of one line in the main-scanning direction of the next image data.

The laser scanner 11 is not limited to the above configuration. For example, a plurality of semiconductor lasers 101 may be provided to emit laser beams in parallel in the sub-scanning direction from the plurality of semiconductor lasers 101, so that a plurality of lines in the main-scanning direction is simultaneously exposed.

The configuration of the mirror 106 is now illustrated. The mirror 106 serving as the reflection body according to the present invention is configured such that, for example, as shown in FIG. 4A, a center of a reflection surface 1061 in the main-scanning direction ("Center of reflection surface" in the figure) is provided at a position displaced by a predetermined range from a center of the mirror 106 in a light beam scanning direction ("Center of mirror" in the figure) in the direction of travel of the laser beam along the light beam scanning direction.

Figure 4A:
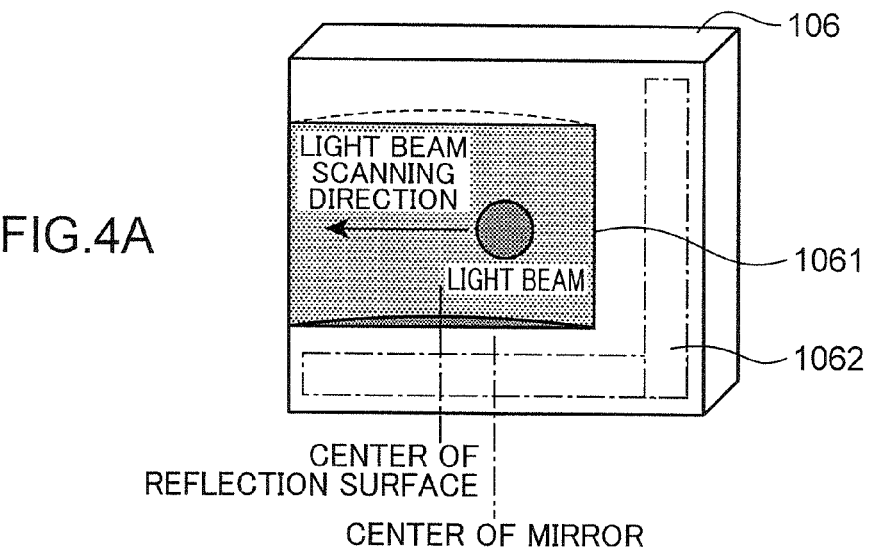
FIG. 4 is a structural view showing one embodiment of a structure of a reflection body.
Figure 4B:
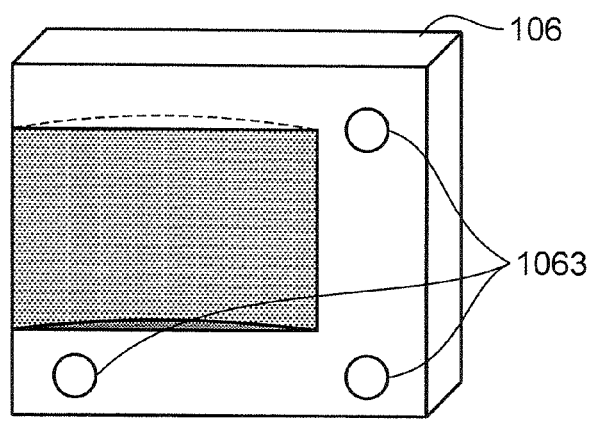
Figure 4C:
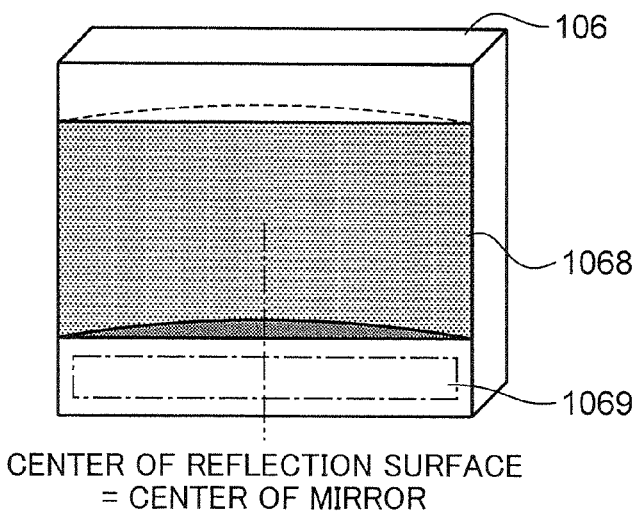

Accordingly, a laser beam to be received by the light receiving surface of the BD sensor 108 is reflected by the reflection surface on the side of travel of the laser beam along the main-scanning direction (hereinafter also referred to as light beam scanning direction), while a degree of concaveness on a curved surface of the reflection mirror 106, which reflects the laser beam emitted to a light receiving surface of the BD sensor 108 is larger in comparison with the case as shown in FIG. 4C, for example, in which a reflection mirror 106 is provided at the same position in the laser scanner 11, whose center in the main-scanning direction is provided at the same position as a center of a reflection surface 1068 in the main-scanning direction being depressed from both edges towards the center along the main-scanning direction and having the same curved arc surface as the reflection surface 1061 (FIG. 4A).

Figure 5A:
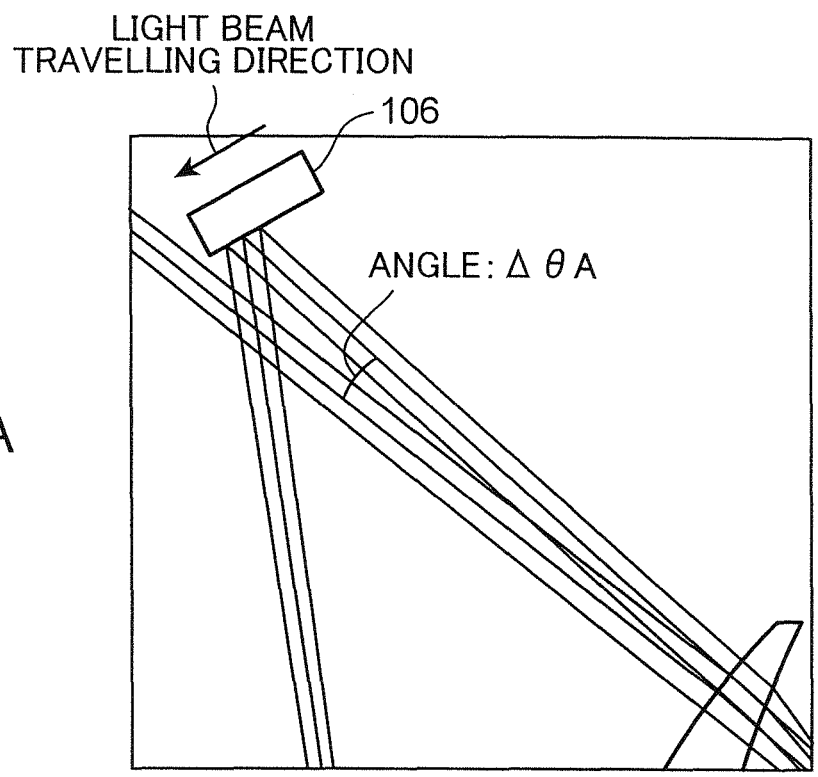
FIG. 5 is an illustrative view of an example of an angle between a laser beam received by a light receiving surface of a synchronizing sensor previously reflected by a reflection surface and a laser beam thereafter initiating scanning of a surface of a photosensitive body previously deflected by a deflection body.
Figure 5B:
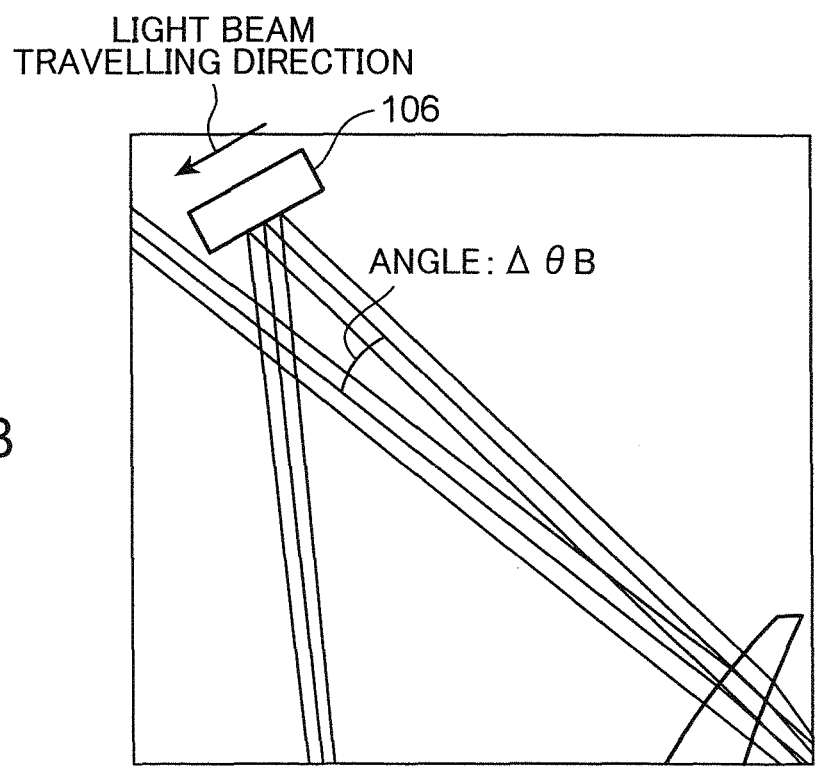

Thus, as shown in FIG. 5 which is an enlarged view of the rectangle area in FIG. 2, an angle ΔθA (FIG. 5A) between a laser beam received by the light receiving surface of the BD sensor 108 previously reflected by the reflection surface 1061 and a laser beam thereafter initiating scanning of the surface of the photosensitive drum 14 previously deflected due to rotation of the rotating polygon mirror 104 is smaller than the angle ΔθB (FIG. 5B) in which the mirror 106 comprising the above reflection surface 1068 is provided at the same position in the laser scanner 11.

When the angle Δθ (e.g. ΔθA and ΔθB in FIG. 5) is increased between a laser beam received by the light receiving surface of the BD sensor 108 previously reflected by the mirror 106 and a laser beam thereafter initiating scanning of the surface of the photosensitive drum 14 previously deflected due to rotation of the rotating polygon mirror 104, longer time is required from the start of reflection of a light beam at one mirror on the peripheral surface of the rotating polygon mirror 104 till reflection of the laser beam upon initiation of scanning of the photosensitive drum 14; namely, the duration required for reflecting a light beam at one mirror on the peripheral surface of the rotating polygon mirror 104 needs to be increased. Accordingly, it is required to enlarge each mirror on the peripheral surface of the rotating polygon mirror 104, causing the rotating polygon mirror 104 to be enlarged.

However, the mirror 106 comprising the reflection surface 1061 serving as the reflection body according to the present invention can make the angle Δθ smaller compared to the case in which a reflection mirror 106 is provided at the same position in the laser scanner 11, whose center in the light beam scanning direction is provided at the same position as a center of a reflection surface 1068 in the light beam scanning direction being depressed from both edges towards the center along the light beam scanning direction and having the same curved arc surface as the reflection surface 1061, thereby allows reduction in the duration for scanning of laser light by one mirror on the peripheral surface of the rotating polygon mirror 104, namely, allows downsizing of mirrors on the peripheral surface of the rotating polygon mirror 104 to downsize the laser scanner 11.

The mirror 106 may also be configured to comprise an installation space 1062 for attaching the mirror 106 to the laser scanner 11, for example as shown in FIG. 4A, at an area which is outside of the area where the reflection surface 1061 is provided and is in a predetermined range from the edge, of the mirror 106, on the opposite side from the direction of travel of the laser beam along the light beam scanning direction and from the lower edge of the mirror 106.

In this case, even when the mirror 106 is attached to the laser scanner 11 via screws, damaging the reflection surface 1061 caused by contact with the reflection surface 1061 can be avoided by screwing the installation space 1062 to the laser scanner 11, thereby enabling the mirror 106 to be easily attached and assembled to the laser scanner 11.

The mirror 106 may also be configured to comprise protrusions 1063 in the installation space 1062, as shown in FIG. 4B, for positioning the mirror 106 on the laser scanner 11.

In this case, the mirror 106 can be attached to the laser scanner 11 at a stable position in the vertical direction and the main-scanning direction by simple assembly of positioning the protrusion 1063 on the laser scanner 11.

The above laser scanner 11 is configured to comprise the cylindrical lens 107, so that the cylindrical lens 107 can condense laser beams reflected by the mirror 106. Thus, it is not necessary to elaborately avoid the mirror 106 and the BD sensor 108 being installed so as to incline in the vertical direction (incline about the light beam scanning direction in FIG. 4). However, it does not intend to mean that the laser scanner 11 is limited to this configuration, and a simple configuration is also possible in which the cylindrical lens 107 is not provided.

The present invention is not limited to the above configurations and various modifications may be contemplated. For example, the above described aspect relates to the printer 1 for black-and-white image formation as an embodiment of the image forming apparatus according to the present invention; however, the image forming apparatus according to the present invention is not limited thereto and may be a color printer for color image formation or a multifunction machine combining the functions for scanner, facsimile, printer and copier.

The configurations and settings illustrated in FIGS. 1 to 5 in relation to the above aspects are merely illustrative and do not intend to limit the present invention to the above aspects.

this application is based on Japanese Patent application No. 2010-267256 filed in Japan Patent Office on Nov. 30, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical scanning device comprising:
   a light source for emitting a laser beam;
   a deflection body for deflecting by reflection of the laser beam emitted from the light source;
   a scanning lens for scanning the laser beam deflected by the deflection body on a surface of a photosensitive body at a constant speed in a main-scanning direction;
   a reflection body having a surface including a reflection surface for reflecting the laser beam deflected towards the outside of the photosensitive body and having passed through the scanning lens, a first region that is arranged at an opposite side in a direction of travel of the laser beam along the main-scanning direction with respect to the reflection surface, and a second region that is arranged at a lower side with respect to the reflection surface; and a synchronizing sensor for receiving the laser beam reflected by the reflection surface to send out a detection signal of the receipt of the laser beam, wherein the reflection surface is composed of a curved arc surface depressed from both edges towards a center in the main-scanning direction, the reflection body is configured such that a center of the reflection surface in the main-scanning direction is provided at a position displaced by a predetermined range in a direction of travel of the laser beam along the main-scanning direction from a center of the reflection body in the main-scanning direction, and an installation space is arranged on the first region and the second region for attaching the reflection body to the optical scanning device.

2. The optical scanning device according to claim 1, further comprising a condensing lens for condensing the laser beam reflected by the reflection surface, wherein the synchronizing sensor receives the laser beam condensed by the condensing lens.

3. An image forming apparatus comprising the optical scanning device according to claim 2.

4. The optical scanning device according to claim 1, wherein the reflection body includes a first protrusion, the second protrusion and a third protrusion in the installation space, for positioning the reflection body on the optical scanning device, the first protrusion being arranged at an upper end portion of the first region, the second protrusion being arranged at a lower end portion of the first region, and the third protrusion being arranged at a downstream end portion in the direction of travel of the laser beam along the main-scanning direction.

5. An image forming apparatus comprising the optical scanning device according to claim 1.

6. An image forming apparatus comprising the optical scanning device according to claim 4.

7. An optical scanning device according to claim 1, wherein the reflection body is a member separate from the scanning lens.

8. An optical scanning device comprising:

a light source for emitting a laser beam;

a deflection body for deflecting by reflection of the laser beam emitted from the light source;

a scanning lens for scanning the laser beam deflected by the deflection body on a surface of a photosensitive body at a constant speed in a first direction;

a reflection body separate from the scanning lens and having a surface including a reflection surface for reflecting the laser beam deflected toward the outside of the photosensitive body and having passed through the scanning lens, a first region adjacent to the reflection surface at a side of a second direction opposite to the first direction, and a second region adjacent to the reflection surface at a side of a third direction perpendicular to the first direction; and a synchronizing sensor for receiving the laser beam reflected by the reflection surface to send out a detection signal indicating receipt of the laser beam, wherein the reflection surface is composed of a curved arc surface in the first direction, and an installation space is arranged on the first region and the second region for attaching the reflection body to the optical scanning device.

* * * * *